Figures 1, 2, 3:
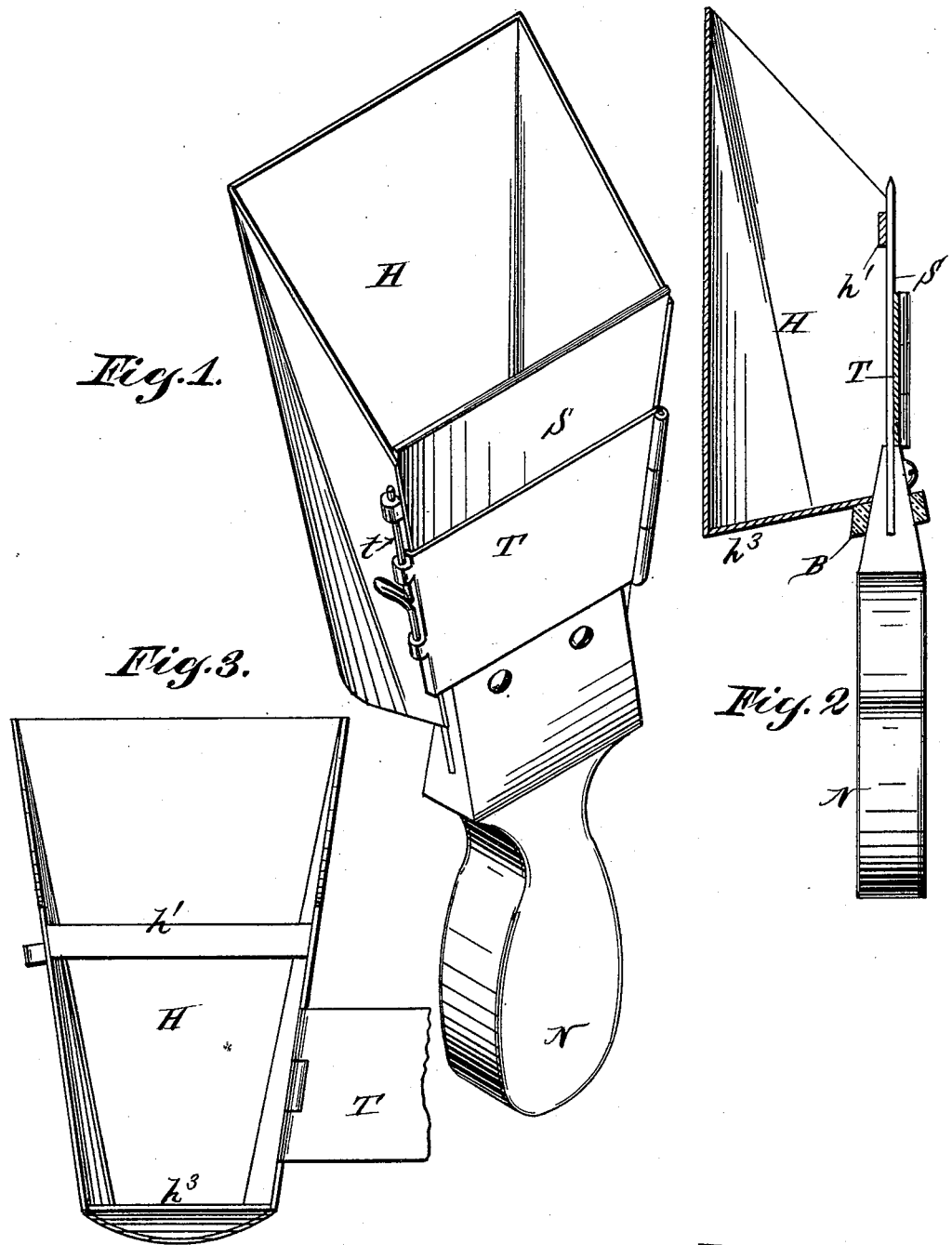

(No Model.) 2 Sheets—Sheet 1.

F. ALLERS.
SCRAPER.

No. 581,527. Patented Apr. 27, 1897.

Witnesses:
D. W. Gardner.
Louis A. Rowley.

Inventor:
Frank Allers
By his Attorney
George William Miatt (No Model.) 2 Sheets—Sheet 2.
F. ALLERS.
SCRAPER.
No. 581,527. Patented Apr. 27, 1897.
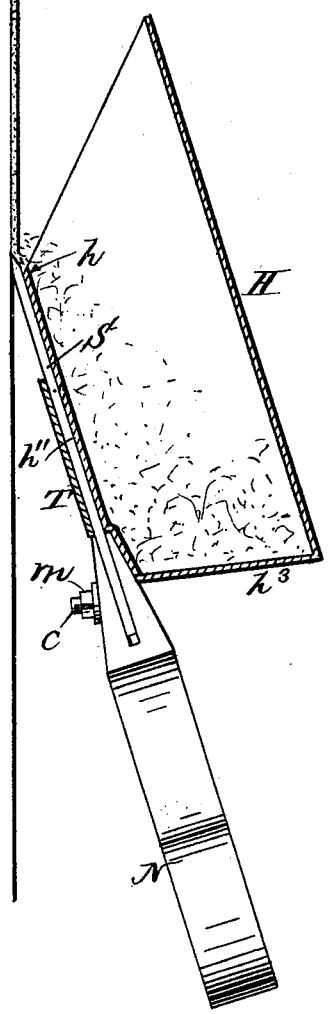
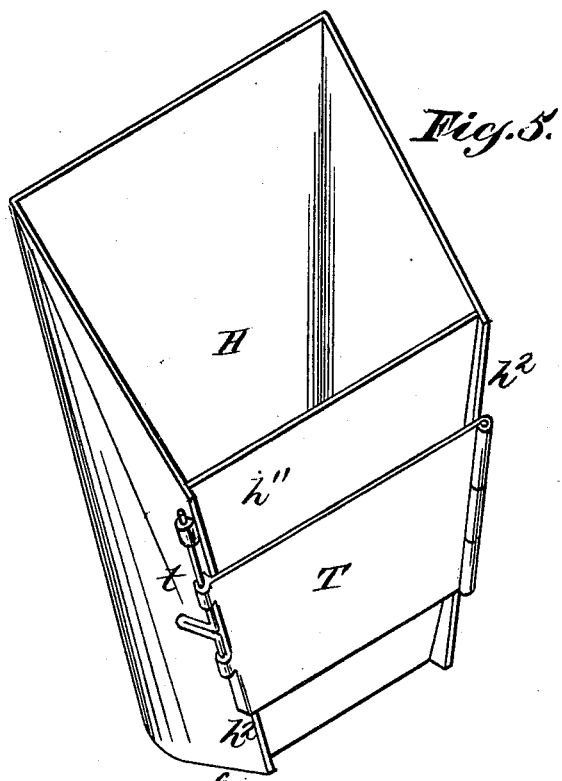
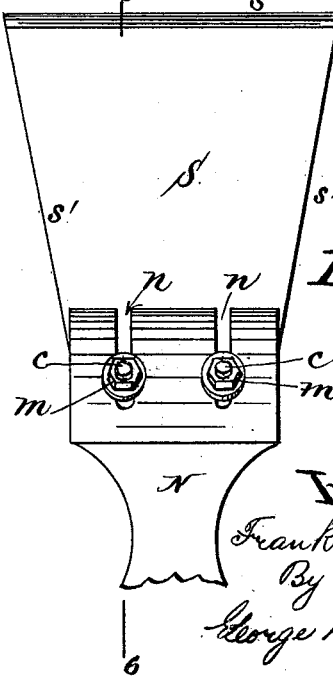
Witnesses:
Inventor:
Frank Allers
By his Attorney

UNITED STATES PATENT OFFICE.

FRANK ALLERS, OF JERSEY CITY, NEW JERSEY.

SCRAPER.

SPECIFICATION forming part of Letters Patent No. 581,527, dated April 27, 1897.

Application filed June 16, 1896. Serial No. 595,740. (No model.)

*To all whom it may concern:*

Be it known that I, FRANK ALLERS, a citizen of the United States, residing in Jersey City, Hudson county, and State of New Jersey, have invented certain new and useful Improvements in Scrapers, of which the following is a specification sufficient to enable others skilled in the art to which the invention appertains to make and use the same.

My invention relates to scrapers used by painters, paper-hangers, varnishers, and others for cleaning surfaces; also, for removing paint, calcimine, &c.

The invention consists, essentially, in an attachment for a scraper consisting of a hopper or receptacle to receive the scrapings, substantially as hereinafter set forth.

In the accompanying drawings, Figure 1 is an isometrical perspective showing a scraper provided with my improvements; Fig. 2, an edge elevation of the scraper, showing its receiving-hopper in section; Fig. 3, an elevation of the side of the hopper adjoining the scraper. Fig. 4 is a sectional elevation showing the device in use. Fig. 5 is an isometrical perspective of the receiving-hopper detached; Fig. 6, a sectional elevation upon plane of line 6 6, Fig. 7; and Fig. 7 is a side elevation of the scraper and the adjoining part of its handle.

The scraper consists of a flat blade S, having its upper edge $s$ sharpened and being fastened at its lower end to a handle N. The device thus formed has heretofore been used alone for scraping and cleaning surfaces, the material detached by the sharp edge $s$ being allowed to escape unrestrained in any direction, a feature which is objectionable in many kinds of work.

In order to collect and store the material removed, I provide the scraper S, either temporarily or permanently, with a hopper H, one edge of which $h$ adjoins the scraping or cutting edge $s$, while the other edges thereof extend outward and forward, so as to catch the material as it flies from the surface treated under the force applied through the scraper. The hopper may be made of such depth as to receive and store a considerable quantity of detached material.

The hopper H may be secured to the blade S by various mechanical expedients, as will be obvious, and I do not confine myself to the identical construction and arrangement of parts shown in the drawings, in which a strap T, hinged to one side wall of the hopper, extends across the blade S and is secured to the opposite side of the hopper by a bolt $t$, thereby confining the blade between the cross-bar $h'$ or the equivalent side wall $h''$ and the said strap T. Since the blade S is wider at its front cutting edge $s$ than at its rear end, where it is attached to the handle N, and since the side walls $h^2$ $h^2$ of the hopper conform to this flare, so as to receive the edges $s'$ $s'$ of the blade, it will be seen that the strap T when bolted over the blade necessarily secures the hopper firmly thereto against either longitudinal or lateral movement, the lower part of the hopper fitting and resting against the upper part of the handle and supporting the hopper from below.

The cross-bar $h'$, which connects the sides of the hopper and is set in from the edges thereof, as shown, affords a bearing against the blade S sufficient to sustain the hopper in position when the strap is bolted and answers the purpose where dry material is to be removed from the surface to be cleaned. Where, however, the device is to be used in the presence of moisture, I prefer to form the hopper with the inner side wall $h''$ extending down to and adjoining the bottom $h^3$, so as to prevent the moisture leaking down onto the handle N; or if the form shown in Figs. 1, 2, and 3 is used in the presence of moisture I provide an absorbent band B around the handle below the bottom $h^3$ of the hopper H, as indicated in Fig. 2.

In order to compensate for the wearing away of the scraping edge $s$ of the scraper-blade S, so that it may always be made to bear the same relation to the hopper H, I prefer to make the blade S adjustable upon its handle N, and this may be accomplished in any desired manner, as by the screw-studs $c$, projecting from the shank of the blade S through the parallel longitudinal slots $n$ $n$, nuts $m$ being provided for holding the blade in the desired position.

As thus explained, it will be understood that my invention comprises, essentially, a scraping blade or tool provided with a hopper or receptacle the mouth of which opens in the direction in which the said blade or tool is moved or manipulated to effect the removal of the material from the surface operated upon.

My invention further comprehends the employment of such a hopper having its sides extended beyond the operating edge of the scraper or tool, by which to readily catch the material as it is removed from a surface, as, for instance, when the tool or scraper is moved or manipulated in an upward direction.

My invention still further comprehends the use of a scraping blade or tool adjustable upon a handle and provided with a hopper, substantially as is herein shown.

What I claim as my invention, and desire to secure by Letters Patent, is—

1. A scraping-tool comprising a hopper the sides of which converge toward the bottom, a cross-piece connecting said sides and being set in from the edges thereof, a scraper or blade having converging edges and fitting between the converging sides of the hopper and resting upon the cross-piece, and means for securing the blade in place, substantially as described.

2. A scraping-tool comprising an open-ended hopper and having the inner side wall $h''$ extending to and joining the bottom of the hopper and being set in from the edges of the sides thereof, a blade or scraper having a handle and fitted in place with its cutting edge adjacent the upper edge of said wall, and means for securing said blade in place upon the hopper, substantially as described.

FRANK ALLERS.

Witnesses:
PETER LEMLER,
GEO. H. STUECK.